United States Patent
Chen (10) Patent No.: US 10,260,925 B2
(45) Date of Patent: Apr. 16, 2019

(54) CONTAINER AND COVER

(71) Applicant: BEIJING RED-SEA TECH CO., LTD., Beijing (CN)

(72) Inventor: Zengxin Chen, Beijing (CN)

(73) Assignee: BEIJING RED-SEA TECH CO., LTD., Beijing (CN)

( * ) Notice: Subject to any disclaimer, the term of this patent is extended or adjusted under 35 U.S.C. 154(b) by 0 days.

(21) Appl. No.: 15/735,182

(22) PCT Filed: Jun. 10, 2016

(86) PCT No.: PCT/CN2016/085391
§ 371 (c)(1),
(2) Date: Dec. 10, 2017

(87) PCT Pub. No.: WO2016/197967
PCT Pub. Date: Dec. 15, 2016

(65) Prior Publication Data
US 2018/0180458 A1  Jun. 28, 2018

(30) Foreign Application Priority Data

Jun. 10, 2015 (CN) .......................... 2015 1 0316691
Jun. 10, 2015 (CN) ..................... 2015 2 0399422 U
Dec. 1, 2015 (CN) ..................... 2015 2 0982335 U (51) Int. Cl.
*B05B 11/00* (2006.01)
*G01F 11/00* (2006.01)
(Continued)

(52) U.S. Cl.
CPC .............. *G01F 11/38* (2013.01); *B05B 11/00* (2013.01); *G01F 11/006* (2013.01); *G01F 11/28* (2013.01); *G01F 15/005* (2013.01)

(58) Field of Classification Search
CPC ........ G01F 11/38; G01F 15/08; G01F 15/005; G01F 22/02; G01F 23/14; G01F 23/02;
(Continued)

(56) References Cited

U.S. PATENT DOCUMENTS 745,876 A * 12/1903 Medley ................. B65D 25/48
215/3
1,242,176 A * 10/1917 Gross ...................... G01F 23/02
220/86.2
(Continued)

FOREIGN PATENT DOCUMENTS

CN    103241463 A    8/2013
CN    105015918 A    11/2015
(Continued)

OTHER PUBLICATIONS

WO2014048341A1—English Translation, machine generated, Jul. 2018.*

*Primary Examiner* — Benjamin R Shaw
(74) *Attorney, Agent, or Firm* — Mark M. Friedman (57) ABSTRACT

Provided is a container, which comprises a container body and a cover and further comprises a variable-pressure component, a metering channel, a liquid extraction channel and an outflow channel. The head of the metering channel is in communication with the variable-pressure component, and the tail thereof is in communication with the outflow channel and the liquid extraction channel. A valve, which is opened when the variable-pressure component is pressurized and is closed when the variable-pressure component is depressurized, is provided between the metering channel and the outflow channel. A valve, which is opened when the variable-pressure component is depressurized and is closed when the variable-pressure component is pressurized, is provided between the metering channel and the liquid extraction channel or within the liquid extraction channel.

(Continued)

The metering channel, the liquid extraction channel and the outflow channel are fixed to the cover.

15 Claims, 6 Drawing Sheets

(51) Int. Cl.
  *G01F 11/28* (2006.01)
  *G01F 11/38* (2006.01)
  *G01F 15/00* (2006.01)
(58) Field of Classification Search
  CPC ........ A47K 5/1205; B67D 7/36; B65D 25/56; B65D 83/00
  USPC .......................................................... 222/401
  See application file for complete search history.

(56) References Cited

U.S. PATENT DOCUMENTS

| | | | | |
|---|---|---|---|---|
| 1,302,276 A * | 4/1919 | Ballard | ............... | G01F 11/32 222/442 |
| 1,763,971 A * | 6/1930 | Kantor | ............... | G01F 11/32 141/353 |
| 1,968,316 A * | 7/1934 | Schmitt | ............... | G01F 11/084 222/153.08 |
| 2,017,145 A * | 10/1935 | Dunn | ............... | B05B 11/0059 222/401 |
| 2,613,111 A * | 10/1952 | Freund | ............... | B05B 11/06 222/323 |
| 3,254,809 A * | 6/1966 | Breneman | ............ | A61J 7/0046 222/442 |
| 4,383,622 A * | 5/1983 | Guth | ............... | B05B 11/06 222/209 |
| 4,986,452 A * | 1/1991 | Takatsuki | ............ | A47J 41/0033 222/209 |
| 5,180,085 A * | 1/1993 | Schmid | ............... | B05B 7/2427 222/211 |
| 5,197,866 A * | 3/1993 | Kim | ............... | B67D 1/0425 222/209 |
| 5,738,254 A * | 4/1998 | de la Guardia | ........ | B67D 3/047 222/400.8 |
| 6,119,900 A * | 9/2000 | Iwamoto | ............... | B67D 1/0425 222/153.13 |
| 6,991,136 B2 * | 1/2006 | de la Guardia | ...... | B67D 1/0425 222/209 |
| 7,131,558 B2 * | 11/2006 | de la Guardia | ....... | B05B 9/0822 222/209 |
| 8,172,115 B1 * | 5/2012 | Mulhauser | ........... | B05B 11/062 222/209 |
| 9,321,579 B2 | 4/2016 | Chen | | |
| 2006/0081657 A1* | 4/2006 | Bonner | ................. | B67D 7/005 222/401 |
| 2012/0036927 A1* | 2/2012 | Sanders | ................. | G01F 23/02 73/291 |
| 2013/0153605 A1* | 6/2013 | Chen | ..................... | A45D 40/00 222/209 |
| 2014/0326757 A1* | 11/2014 | Chen | ..................... | B05B 9/0816 222/209 |
| 2015/0183570 A1* | 7/2015 | Chen | ..................... | B65D 25/38 220/661 |
| 2015/0240959 A1* | 8/2015 | Chen | ..................... | B65D 81/24 222/1 |
| 2016/0002023 A1* | 1/2016 | Chen | ................... | B67D 7/0205 222/1 |
| 2018/0172496 A1* | 6/2018 | Chen | ................... | B65D 25/56 |

FOREIGN PATENT DOCUMENTS

| | | | |
|---|---|---|---|
| CN | 105236025 A | 1/2016 | |
| CN | 105730891 A | 7/2016 | |
| JP | 2014043250 A | 3/2014 | |
| WO | WO 2014048341 A1 * | 4/2014 | ............ B65D 81/24 |

* cited by examiner

CONTAINER AND COVER

BACKGROUND

Technical Field

The present invention relates to a container and a cover of a container body, and in particular, to a container and a cover of a container body having a metering function and implementing liquid extraction by means of pressure variation.

Related Art

Fluids, such as hand sanitizers, laundry detergents, disinfectants, shampoos, shower gels, toothpastes, soy sauces, vinegar, edible oil, liquid drugs, cosmetics, and health-care products, are frequently used in daily life. Although there are various shapes of containers for containing such products, few of them have innovative structures, no significant improvement has been made in many years, and many long-standing problems still exist.

For example, there is no container for quantitative extraction in life. Another graduated container is usually used by people for quantitative extraction when necessary. Sometimes, a rough metering method such as "2.5 bottle covers" is still used. This is inconvenient in operation, inaccurate in metering, and is prone to cause pollution to or a waste of a product during extraction.

For example, when a substance contained in a container is extracted by means of pressurization, a pressurization method is only squeezing a wall of the container or filling a gas into a body of the container. Disadvantages of the pressurization method are that much air is introduced, causing pollution to the product, and relatively great pressure is needed to pressurize the container body.

For example, in an existing variable-pressure metering container, some of a variable-pressure component, a metering channel, an outflow channel, and the like are located on a container body, or are located on a cover. In this way, air tightness of the container may be damaged in a liquid adding process and a use process, reducing use convenience. When the metering channel, the outflow channel, and the like are located on the container body, production costs, transportation costs and use costs are increased, and adaptation of the components is reduced.

For example, there are length measurement tools such as spiral dial gauges. However, there is no precision measurement tool that has a large range for measuring volumes. Because a precise measurement of a volume is complex and causes great errors, an index such as concentration usually cannot be accurately determined.

On the other hand, intelligent kitchens, cooking robots, and the like have higher requirements on metering of liquids such as edible oil, liquid salts, soy sauces, and vinegar. No suitable liquid metering method has been found yet.

These common problems are prone to be ignored. Long-term attention needs to be paid to occurrence of novel solutions.

SUMMARY

To resolve the foregoing various problems in the prior art, the present invention provides a container, including a container body and a cover, and further including: a variable-pressure component, a metering channel, a liquid extraction channel, and an outflow channel, where a head of the metering channel is in communication with the variable-pressure component, and a tail is in communication with the outflow channel and the liquid extraction channel;

a valve opened when pressurized by the variable-pressure component and closed when depressurized by the variable-pressure component is disposed between the metering channel and the outflow channel;

a valve opened when depressurized by the variable-pressure component and closed when pressurized by the variable-pressure component is disposed between the metering channel and the liquid extraction channel or within the liquid extraction channel; and the metering channel, the liquid extraction channel, and the outflow channel are fixed to the cover.

The variable-pressure component is a component that can cause changes of positive and negative pressure in the metering channel. The metering channel is a channel used for storing a contained substance under negative pressure and instructing the contained substance to flow out under positive pressure. The entire metering channel may be graduated. Alternatively, a part of the metering channel may be graduated. Alternatively, the metering channel may not be graduated. The entire channel has a determined volume, to implement limited extraction. The liquid extraction channel is a channel from the metering channel to the container body and through which the contained substance in the container body can be extracted to the metering channel.

Because the container is simple in structure, mass production can be conveniently implemented and production costs can be reduced. The container can implement convenient, rapid and quantitative (or limited) extraction of the substance contained in the container, and may be applied to the fields such as liquid containers, metering tools, intelligent kitchen systems and cooking robots.

The metering channel, the liquid extraction channel, and the outflow channel of the container are fixed to the cover (where in the present invention, the fixing to the cover includes that the channels are fixed above the cover, in the cover, or below the cover, or pass through the top of the cover, the inside of the cover, or the bottom of the cover, and this is mainly for emphasizing integrity between the metering channel, the liquid extraction channel, and the outflow channel and the cover). The cover is located on an upper portion or an outer portion of the container body. Such a container has good air tightness and is convenient in use, maintenance, and repair, thereby conforming to use habits of users.

In the container, a graduated portion of the metering channel may be spiral-shaped. The spiral shape can prolong the metering channel within a limited area, thereby improving metering accuracy and conforming to use habits of users.

In the container, a graduated portion of the metering channel may be located on a surface of the cover. The graduated portion of the metering channel is located on the surface of the cover, so that the graduated portion of the metering channel can be directly observed by a user.

In the container, an element that is in the variable-pressure component and that can be automatically restored after being compressed may be located on a handle, and the handle is mounted on the cover. The element that is in the variable-pressure component and that can be automatically restored after being compressed is located on the handle, so that an operation can be conveniently performed by a user. The handle is mounted on the cover, so as to prevent a split-type structure from degrading overall air tightness of the container.

In the container, an opening through which a container external outlet of the outflow channel is inserted to the container body may be provided on the cover. When there are excessive gases in the metering channel and the metering accuracy is affected, or when a liquid in the metering channel does not reach a required position, the variable-pressure component performs pressurization to retrieve the liquid in the metering channel to the container body by using the opening through which the outflow channel is inserted to the container body. In this way, new extraction can be conveniently started.

In the container, a three-way valve may be disposed on the outflow channel, and the three-way valve is separately in communication with the metering channel, a container external outlet, and the container body. Likewise, when there are excessive gases in the metering channel and the metering accuracy is affected, or when a liquid in the metering channel does not reach a required position, the variable-pressure component performs pressurization to retrieve the liquid in the metering channel to the container body by using three-way valve. In this way, new extraction can be conveniently started.

The container may further include an initial positioning apparatus, and the initial positioning apparatus includes: a return cavity, a return channel, and a component capable of closing the return channel, where the return cavity is in communication with the variable-pressure component and an initial end of the metering channel; the initial end of the metering channel is higher than the bottom of the return cavity; and the return channel is in communication with the bottom of the return cavity and the container body.

When the variable-pressure component performs depressurization, the initial positioning apparatus collects a liquid that exceeds an initial position of the metering channel in the return cavity. When liquid extraction is performed by means of pressurization, the liquid in the metering channel is extracted, and the liquid in the return cavity does not enter the metering channel again. In this way, metering starts from the initial position, and metering extraction or limited extraction is accurate and convenient. When there are many liquids in the return cavity, or after liquid extraction is completed, the return channel is opened, so that the liquid in the return cavity flows back to the container body, and is not wasted, oxidized by outside air or polluted. When the variable-pressure component further performs depressurization, an initial position of the liquid in the metering channel can be re-determined, and metering extraction or limited extraction is performed when pressurization is performed.

Because the self-metering container is simple in structure, mass production can be implemented and production costs can be reduced. The container can implement convenient, rapid, and accurate extraction of the contained substance during use. In addition, the return cavity can prevent the liquid in the metering channel from being mistakenly sucked into the variable-pressure component, and can further prevent the gases in the metering channel from interfering with the metering accuracy. In this way, the self-metering container overcomes the various disadvantages of metering containers in the prior art.

In the container having the return cavity, the initial positioning apparatus may be fixed to the cover. The initial positioning apparatus is mounted on the cover, so that the container has good air tightness and is convenient in use, maintenance, and repair, thereby conforming to use habits of users.

In the container having the return cavity, the return cavity may be made of a transparent material and is located at a position that can be observed by an operator. The operator can directly observe the return cavity, so that an error caused by inaccurate initial positioning can be prevented.

In the container having the return cavity, the component may be connected to a knob or a handle that is outside the container. A manual operation is reliable and costs are reduced.

In the container having the return cavity, the component may be a valve combination disposed within the return channel and closed when pressurized or depressurized by the variable-pressure component and opened when there is no change of pressure. By using the valve combination within the return channel, it is ensured that gas leakage does not occur in the return channel when pressurization or depressurization is performed by the variable-pressure component and that the liquid in the return cavity flows back to the container body when there is no change of pressure. Because the liquid in the return cavity flows back automatically, use convenience is improved.

In the container having the return cavity, the valve combination may be two one-way valves in communication with each other and in reverse serial connection. The valve combination uses commonly used one-way valves, so that adaptation of the initial positioning apparatus is improved.

In the container having the return cavity, the valve combination may include a valve plug capable of reciprocally moving within a valve body; an intermediate channel is disposed on an upstream end of the valve plug; the intermediate channel leads to a groove that is on an outer side surface of the valve plug; and an upstream end of the intermediate channel is in communication with the return cavity through the return channel, and a downstream end leads to the outside of the valve body through the groove that is on the outer side surface of the valve plug. The valve combination may have low costs and better sealing performance, so that position changes of the liquid in the metering channel caused by pressure variation are more sensitive.

In the container having the return cavity, the valve combination may include two openings sequentially provided within the return channel and a movable component located between the two openings. The valve combination is simple in structure, small in volume, and lower in costs.

Further, the movable component is a sheet or a small ball. Because of the sheet or small ball, the valve combination has a relatively good sealing effect.

According to another aspect, the present invention further provides a cover of a container body. The cover may be mounted on a container body. The cover includes: a variable-pressure component, a metering channel, a liquid extraction channel, and an outflow channel, where a head of the metering channel is in communication with the variable-pressure component, and a tail is in communication with the outflow channel and the liquid extraction channel;

a valve opened when pressurized by the variable-pressure component and closed when depressurized by the variable-pressure component is disposed between the metering channel and the outflow channel;

a valve opened when depressurized by the variable-pressure component and closed when pressurized by the variable-pressure component is disposed between the metering channel and the liquid extraction channel or within the liquid extraction channel; and the metering channel, the liquid extraction channel, and the outflow channel are fixed to the cover.

The cover of a container body can be freely combined with the container body for use, and also resolves the various problems in the prior art. The present invention has the advantages of having a simple structure, good reproducibility, high practicability and a wide range of application, conserving materials, preventing air leakage and product pollution, avoiding the waste of substance contained, offering easy and accurate extraction, and being convenient in use not easy to break.

DETAILED DESCRIPTION

Embodiment 1

Figure 1:
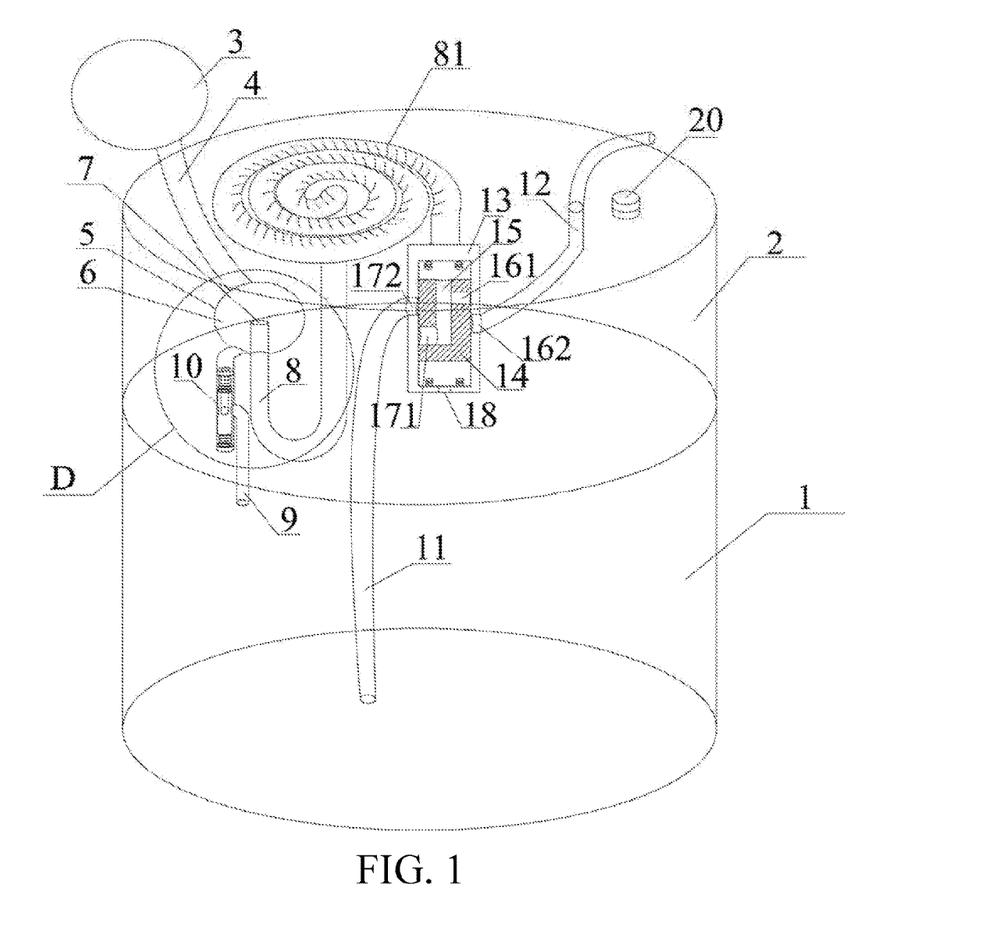
FIG. 1 is a schematic structural diagram of a self-metering container according to Embodiment 1.
Figure 2:
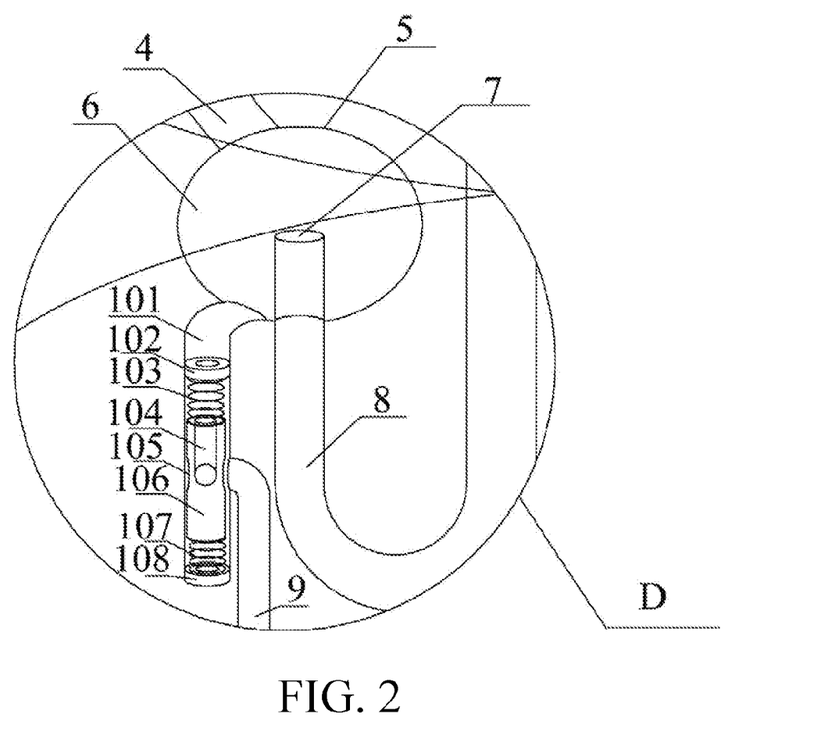
FIG. 2 is a partially enlarged view of a part D in FIG. 1.

As shown in FIG. 1 and FIG. 2, FIG. 1 and FIG. 2 show a container that uses an initial positioning system in the present invention according to Embodiment 1. The container substantially includes a container body 1 and a top cover 2, and the top cover 2 is an upper portion of the container body 1. The container body 1 contains most of a contained substance. Other components such as a variable-pressure component, an initial positioning apparatus, a metering channel 8, a liquid extraction channel 11, an outflow channel 12, and a valve are fixedly mounted on the top cover 2. The top cover 2 further includes a one-way valve 20, and the one-way valve 20 only allows liquids and gases to enter the container body 1.

The variable-pressure component is a component capable of pressurizing and depressurizing a return cavity 6 and includes an airbag 3 and a variable-pressure channel 4. The airbag 3 is located above the top cover 2 and is fixed to the top cover 2 by using the variable-pressure channel 4. The initial positioning apparatus includes: the return cavity 6, a return channel 9, and a valve combination on the return channel 9. The variable-pressure channel 4 passes through the top of the top cover 2 and is in communication with the return cavity 6 that is located within the top cover 2 and that is surrounded by a housing 5. An initial end 7 of the metering channel 8 extends into the return cavity 6 and is higher than the bottom of the return cavity 6. The return channel 9 is in communication with the bottom of the return cavity 6 and the container body 1. The return channel 9 includes three sections: an upstream segment 101, an internal segment (valve combination 10), and a downstream segment. The valve combination 10 has good sealing performance and includes a valve plug 106 capable of reciprocally moving within a valve body. An intermediate channel 104 is disposed on an upstream end of the valve plug. The intermediate channel 104 leads to a groove 105 that is on an outer side surface of the valve plug 106. The upstream segment 101 is in communication with the intermediate channel 104, and the downstream segment leads to the outer side surface of the valve plug 106 by using the valve body. An upper baffle 102 and a spring 103, and a lower baffle 108 and a spring 107 are capable of maintaining the valve plug 106 at a position that enables the groove 105 to be in communication with the downstream segment of the return channel 9 when there is no pressure within the return channel 9.

The initial end 7 of the metering channel 8 extends into the return cavity 6, and a middle segment is a metering segment that has a metering graduation 81, and an end is connected to a control valve that includes a valve body 13 and a valve plug 14, and is in communication with an intermediate channel 15 that is within the valve plug 14. The valve body 13 in the control valve is externally connected to three channels: the liquid extraction channel 11, the outflow channel 12, and the end of the metering channel 8. The liquid extraction channel 11 leads to the bottom of the container body 1. The valve plug 14 in the control valve is located within an internal cavity of the valve body 13 and is capable of sliding up and down within the cavity. A space between an outer peripheral side of the valve plug 14 and the valve body 13 is sealed by using a liquid. The intermediate channel 15 is within the valve plug 14. The intermediate channel 15 has an opening 161 and an opening 171 on the outer peripheral side surface of the valve plug. An opening 162 and an opening 172 are provided on the valve body. The opening 162 is in communication with the outflow channel 12, and the opening 172 is in communication with the liquid extraction channel 11.

Figure 6:
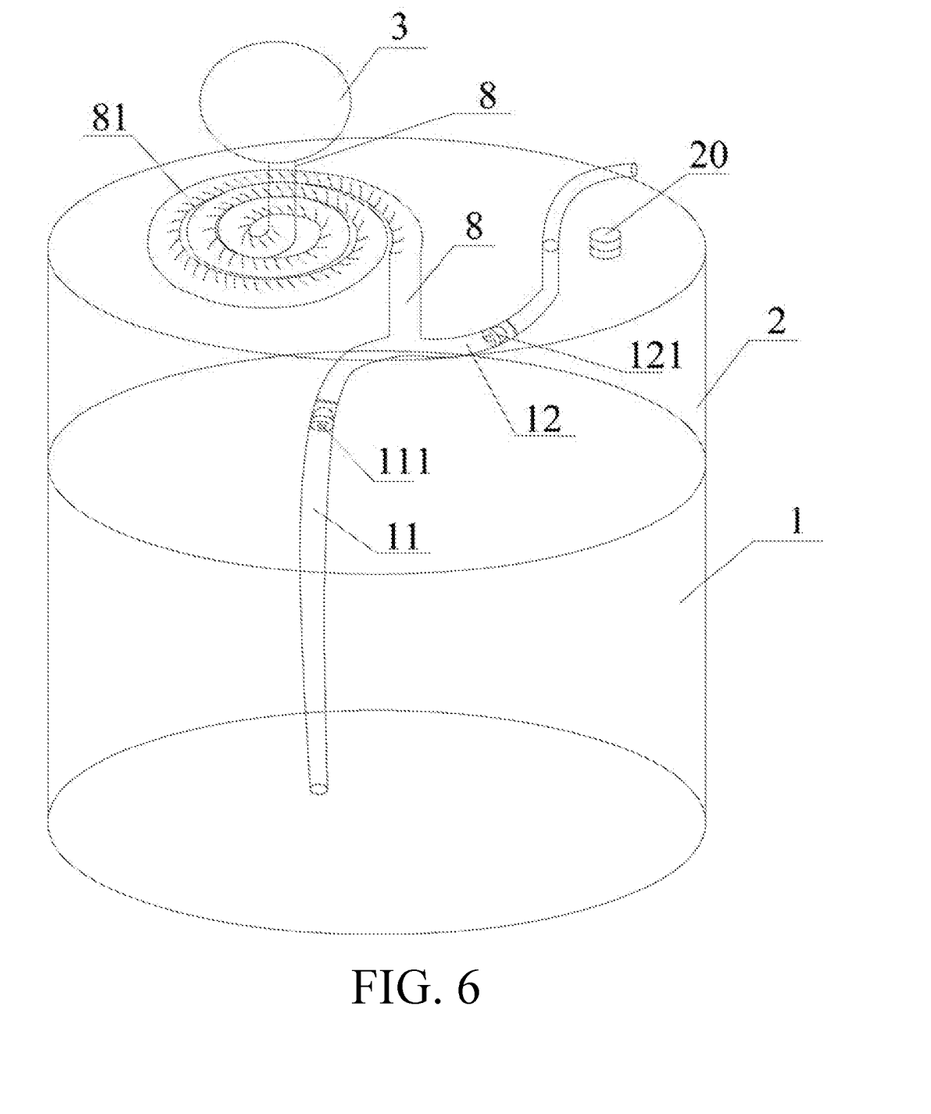
FIG. 6 is a schematic structural diagram of a self-metering container according to Embodiment 4.

According to different positions to which the valve plug 14 reciprocally slides within the valve body 13, there are three different communication relationships between the opening 161 and the opening 162, and the opening 171 and the opening 172: only the opening 161 is in communication with the opening 162; neither the opening 161 is in communication with the opening 162 nor the opening 171 is in communication with the opening 172 (where the state is shown in FIG. 6); and only the opening 171 is in communication with the opening 172. A spring is mounted on each of two ends of the cavity. The springs enable the valve plug 14 to be at a position that prevents the opening 161 from being in communication with the opening 162 and the opening 171 from being in communication with the opening 172 when there is no external pressure. A pressure relief opening 18 is disposed on a lower end of the valve body 13. The pressure relief opening 18 leads to the inside of the container body 1.

An outflow end of the outflow channel 12 extends out of the top cover 2.

Steps of extracting the substance contained in the container from the container are as follows:

The squeezed airbag 3 is released, so that the airbag 3 depressurizes the return cavity 6 by using the variable-pressure channel 4. The valve plug 106 in the valve combination 10 moves upward, and the groove 105 is not in communication with the downstream segment of the return channel 9.

The valve plug 14 in the control valve moves upward under negative pressure, and the opening 171 is in communication with the opening 172, so that the liquid extraction channel 11 is in communication with the metering channel 8. The contained substance enters the metering channel 8 from the container body 1 under the negative pressure. When the contained substance that enters the metering channel 8 is higher than the initial end 7, the contained substance flows to the bottom of the return cavity 6.

After the airbag 3 completes the depressurization, there is no negative pressure within the return cavity 6 or the return channel 9. The valve plug 106 in the valve combination 10 moves downward under an action of the spring 103, the groove 105 is in communication with the downstream segment of the return channel 9, and the contained substance in the return cavity 6 and the return channel 9 flows back to the container body 1. The valve plug 14 in the control valve moves downward under an action of the spring that is on an upper end of the valve body 13, and the opening 161 is not in communication with the opening 162 and the opening 171 is not in communication with the opening 172.

When the contained substance needs to be extracted, the airbag 3 is squeezed, so that the airbag 3 pressurizes the return cavity 6 by using the variable-pressure channel 4.

The valve plug 106 in the valve combination 10 moves downward, and the groove 105 is not in communication with the downstream segment of the return channel 9.

The valve plug 14 in the control valve moves downward under positive pressure, and the opening 161 is in communication with the opening 162, so that the outflow channel 12 is in communication with the metering channel 8. The contained substance in the metering channel 8 (from the initial end 7) flows out from the outflow channel 12 under the positive pressure. An outflow amount may be determined according to the graduation on the metering channel 8. There is a maximum outflow amount, and the maximum outflow amount is a total amount of the contained substance within the metering channel 8 and within a portion that is of the intermediate channel 15 and that is above a horizontal position at which the opening 161 is located. By means of this embodiment, metering extraction and limited extraction can further be implemented.

After the extraction is completed, the pressurization is stopped and there is no positive pressure within the return cavity 6 or the return channel 9, so that the valve plug 106 in the valve combination 10 moves upward, and the groove 105 is in communication with the downstream segment of the return channel 9. The valve plug 14 in the control valve moves upward under an action of the spring that is on the lower end of the valve body 13, and the opening 161 is not in communication with the opening 162 and the opening 171 is not in communication with the opening 172.

Likewise, because of the existence of the one-way valve 20, only a limited amount of outside gases can be in contact with the contained substance in the container body 1. This can reduce pollution to and oxidation of the contained substance.

In this way, the container is ready for next-time metering (limited) extraction.

Embodiment 2

Figure 3:
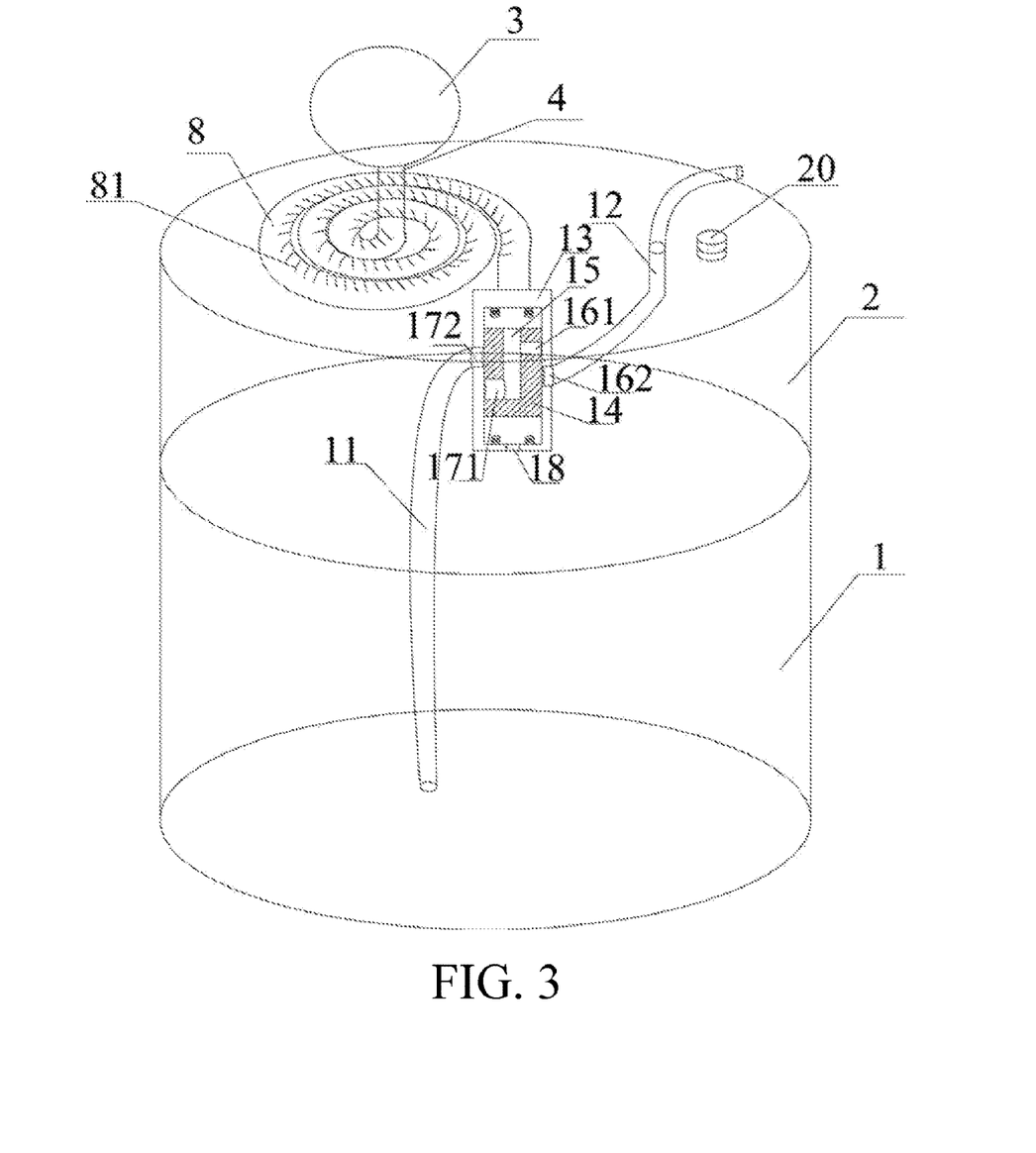
FIG. 3 is a schematic structural diagram of a self-metering container according to Embodiment 2.

As shown in FIG. 3, FIG. 3 shows a container according to Embodiment 2. Compared with the container in Embodiment 1, an initial positioning apparatus is not used, and a variable-pressure channel 4 of a variable-pressure component is in direct communication with a metering channel 8. The container also substantially includes a container body 1 and a top cover 2, and the top cover 2 is an upper portion of the container body 1. Other components such as the variable-pressure component, the metering channel 8, a liquid extraction channel 11, an outflow channel 12, and a valve are fixedly mounted on the top cover 2. The top cover 2 further includes a one-way valve 20.

An initial end of the metering channel 8 is in communication with the variable-pressure channel 4, and a middle segment is a metering segment that has a metering graduation 81, and an end is connected to a control valve that includes a valve body 13 and a valve plug 14, and is in communication with an intermediate channel 15 that is within the valve plug 14. The valve body 13 in the control valve is externally connected to three channels: the liquid extraction channel 11, the outflow channel 12, and the end of the metering channel 8. The liquid extraction channel 11 leads to the bottom of the container body 1. The valve plug 14 in the control valve is located within an internal cavity of the valve body 13 and is capable of sliding up and down within the cavity. A space between an outer peripheral side of the valve plug 14 and the valve body 13 is sealed by using a liquid. The intermediate channel 15 is within the valve plug 14. The intermediate channel 15 has an opening 161 and an opening 171 on the outer peripheral side surface of the valve plug. An opening 162 and an opening 172 are provided on the valve body. The opening 162 is in communication with the outflow channel 12, and the opening 172 is in communication with the liquid extraction channel 11.

According to different positions to which the valve plug 14 reciprocally slides within the valve body 13, there are three different communication relationships between the opening 161 and the opening 162, and the opening 171 and the opening 172. A spring is mounted on each of two ends of the cavity. The springs enable the valve plug 14 to be at a position that prevents the opening 161 from being in communication with the opening 162 and the opening 171 from being in communication with the opening 172 when there is no external pressure. A pressure relief opening 18 is disposed on a lower end of the valve body 13. The pressure relief opening 18 leads to the inside of the container body 1.

An outflow end of the outflow channel 12 extends out of the top cover 2.

The container in Embodiment 2 is simple in structure and is reliable, and has good air tightness.

Embodiment 3

Figure 4:
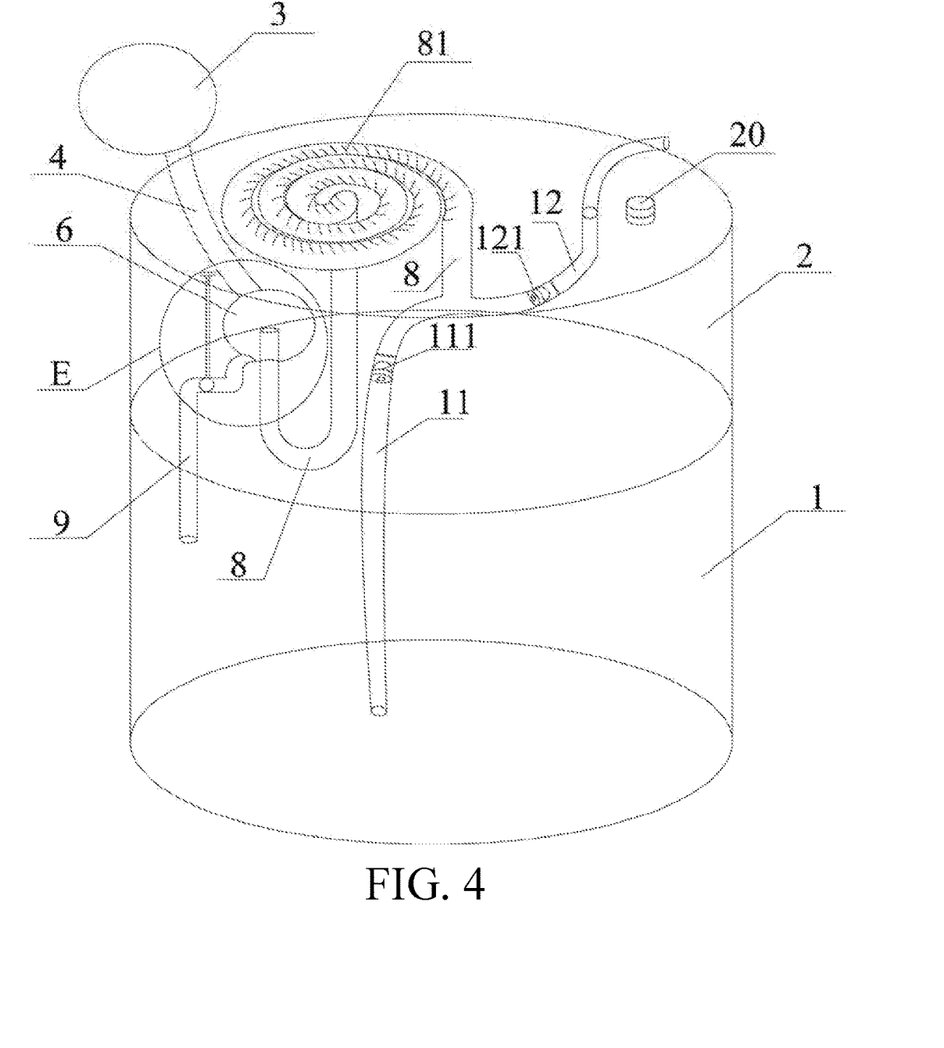
FIG. 4 is a schematic structural diagram of a self-metering container according to Embodiment 3.
Figure 5:
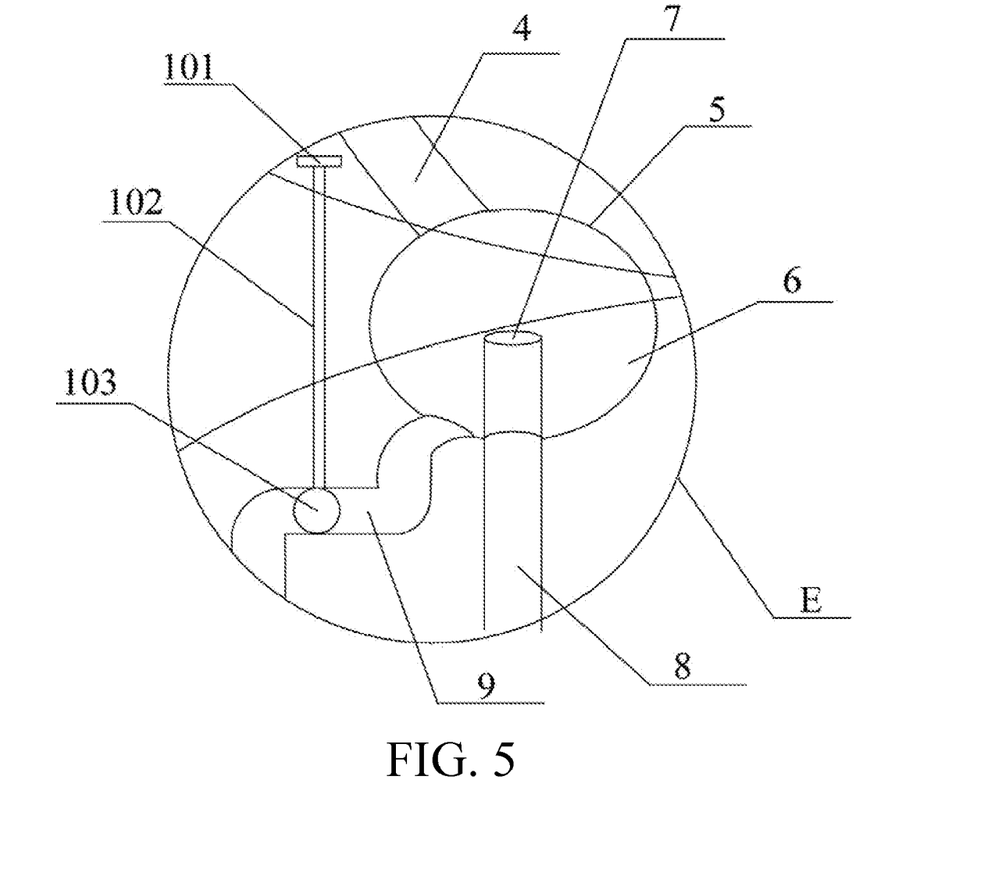
FIG. 5 is a partially enlarged view of a part E in FIG. 3.

As shown in FIG. 4 and FIG. 5, FIG. 4 and FIG. 5 show a container that uses an initial positioning system in the present invention according to Embodiment 3. The container substantially includes a container body 1 and a top cover 2, and the top cover 2 is an upper portion of the container body 1. The container body 1 contains most of a contained substance. Other components such as a variable-pressure component, an initial positioning apparatus, a metering channel 8, a liquid extraction channel 11, an outflow channel 12, and a valve are mounted on the top cover 2. The top cover 2 further includes a one-way valve 20, and the one-way valve 20 only allows liquids and gases to enter the container body 1.

The variable-pressure component is a component capable of pressurizing and depressurizing a return cavity 6 and includes an airbag 3 and a variable-pressure channel 4. The airbag 3 is located above the top cover 2 and is fixed to the top cover 2 by using the variable-pressure channel 4. The initial positioning apparatus includes: the return cavity 6, a return channel 9, and a valve combination on the return channel 9. The variable-pressure channel 4 passes through the top of the top cover 2 and is in communication with the return cavity 6 that is located within the top cover 2 and that is surrounded by a housing 5. An initial end 7 of the metering channel 8 extends into the return cavity 6 and is higher than the bottom of the return cavity 6. The return channel 9 is in communication with the bottom of the return cavity 6 and the container body 1. A valve 103 is disposed within the return channel 9. The valve 103 is connected to a knob 101 that is outside the top cover 2 by using a connecting rod 102.

The initial end 7 of the metering channel 8 extends into the return cavity 6, a middle segment is a metering segment that has a metering graduation 81, and an end is in communication with the liquid extraction channel 11 and the outflow channel 12. The liquid extraction channel 11 leads to the bottom of the container body 1, and a one-way valve 111 that only allows the contained substance to flow upward is disposed in the liquid extraction channel 11. The outflow channel 12 leads to the outside of the top cover 2, and a one-way valve 121 that only allows a liquid to flow outward is disposed in the outflow channel 12.

Steps of extracting the substance contained in the container from the container are as follows:

The knob 101 is rotated, so that the return channel 9 between the bottom of the return cavity 6 and the container body 1 is closed.

The squeezed airbag 3 is released, so that the airbag 3 depressurizes the return cavity 6 by using the variable-pressure channel 4.

The one-way valve 111 is opened under negative pressure, so that the liquid extraction channel 11 is in communication with the metering channel 8. The contained substance enters the metering channel 8 from the container body 1 under the negative pressure. When the contained substance that enters the metering channel 8 is higher than the initial end 7, the contained substance flows to the bottom of the return cavity 6.

When the contained substance needs to be extracted, the airbag 3 is squeezed, so that the airbag 3 pressurizes the return cavity 6 by using the variable-pressure channel 4.

The one-way valve 121 is opened, and the contained substance in the metering channel 8 (from the initial end 7) flows out from the outflow channel 12 under positive pressure. An outflow amount may be determined according to the graduation on the metering channel 8. There is a maximum outflow amount, and the maximum outflow amount is a total amount of the contained substance within the metering channel 8 and within a portion that is of the intermediate channel 15 and that is above a horizontal position at which the opening 161 is located. By means of this embodiment, metering extraction and limited extraction can further be implemented.

After the extraction is completed, the pressurization is stopped, so that the contained substance stops flowing out.

In this way, the container is ready for next-time metering (limited) extraction.

When the contained substance in the return cavity 6 is to be higher than the initial end 7 of the metering channel 8, the knob 101 is rotated, so that the contained substance in the return cavity 6 flows back to the container body 1.

Because each metering starts from the initial end 7 of the metering channel 8, the metering is convenient and accurate.

Embodiment 4

As shown in FIG. 6, FIG. 6 shows a container according to Embodiment 4. Compared with the container in Embodiment 3, an initial positioning apparatus is not used, and an airbag 3 of a variable-pressure component is in direct communication with a metering channel 8. The container also substantially includes a container body 1 and a top cover 2, and the top cover 2 is an upper portion of the container body 1. Other components such as the variable-pressure component, the metering channel 8, a liquid extraction channel 11, an outflow channel 12, and a valve are fixedly mounted on the top cover 2. The top cover 2 further includes a one-way valve 20.

An initial end of the metering channel 8 is in communication with the airbag 3, a middle segment is a metering segment that has a metering graduation 81, and an end is in communication with the liquid extraction channel 11 and the outflow channel 12. The liquid extraction channel 11 leads to the bottom of the container body 1, and a one-way valve 111 that only allows the contained substance to flow upward is disposed in the liquid extraction channel 11. The outflow channel 12 leads to the outside of the top cover 2, and a one-way valve 121 that only allows a liquid to flow outward is disposed in the outflow channel 12.

An outflow end of the outflow channel 12 extends out of the top cover 2.

The container in Embodiment 4 is simple in structure and is reliable, and has good air tightness.

Steps of extracting the substance contained in the container from the container are as follows:

The squeezed airbag 3 is released, so that the airbag 3 depressurizes the metering channel 8.

The one-way valve 111 is opened under negative pressure, so that the liquid extraction channel 11 is in communication with the metering channel 8. The contained substance enters the metering channel 8 from the container body 1 under the negative pressure.

When the contained substance needs to be extracted, the airbag 3 is squeezed, so that the airbag 3 pressurizes the metering channel 8.

The one-way valve 121 is opened, and the contained substance in the metering channel 8 flows out from the outflow channel 12 under positive pressure. An outflow amount may be determined according to the graduation on the metering channel 8. There is a maximum outflow amount, and the maximum outflow amount is a total amount of the contained substance within the metering channel 8 and within a portion that is of the intermediate channel 15 and that is above a horizontal position at which the opening 161 is located. By means of this embodiment, metering extraction and limited extraction can further be implemented.

Although the embodiments of the present invention are shown and described above, a person of ordinary skill in the art may understand that various changes, modifications, replacements, variations and combinations may further be made to the embodiments without departing from the principle and spirit of the present invention. For example, the variable-pressure component may be a barrel piston manual variable-pressure component, or the like. The protection scope of the present invention shall be subject to the appended claims and the equivalents thereof.

What is claimed is:

1. A container, comprising a container body and a cover, and further comprising: a variable-pressure component, a metering channel, a liquid extraction channel, an outflow channel, and an initial positioning apparatus, wherein a head of the metering channel is in communication with the variable-pressure component, and a tail is in communication with the outflow channel and the liquid extraction channel;

a valve opened when pressurized by the variable-pressure component and closed when depressurized by the variable-pressure component is disposed between the metering channel and the outflow channel;

a valve opened when depressurized by the variable-pressure component and closed when pressurized by the variable-pressure component is disposed between the metering channel and the liquid extraction channel or within the liquid extraction channel;

the metering channel, the liquid extraction channel, and the outflow channel are fixed to the cover; and the initial positioning apparatus comprises a return cavity, the return cavity is made of a transparent material.

2. The container according to claim 1, wherein a graduated portion of the metering channel is spiral-shaped.

3. The container according to claim 1, wherein a graduated portion of the metering channel is located on a surface of the cover.

4. The container according to claim 1, wherein a diameter of the metering channel is less than 1 millimeter.

5. The container according to claim 1, wherein the variable-pressure component includes an airbag and a variable-pressure channel, the airbag is located above the top cover and is fixed to the top cover by using the variable-pressure channel.

6. The container according to claim 1, wherein an opening through which a container external outlet of the outflow channel is inserted to the container body is provided on the cover.

7. The container according to claim 1, wherein a three-way valve is disposed on the outflow channel, and the three-way valve is separately in communication with the metering channel, a container external outlet, and the container body.

8. The container according to claim 1, wherein the initial positioning apparatus further comprising: a return channel and a component capable of closing the return channel, the return cavity is in communication with the variable-pressure component and an initial end of the metering channel;

the initial end of the metering channel is higher than the bottom of the return cavity; and the return channel is in communication with the bottom of the return cavity and the container body.

9. The container according to claim 8, wherein the initial positioning apparatus is fixed to the cover.

10. The container according to claim 8, wherein the component is connected to a knob or a handle that is outside the container.

11. The container according to claim 8, wherein the component is a valve combination disposed within the return channel and closed when pressurized or depressurized by the variable-pressure component and opened when there is no change of pressure.

12. The container according to claim 11, wherein the valve combination comprises two one-way valves in communication with each other and in reverse serial connection.

13. The container according to claim 11, wherein the valve combination comprises a valve plug capable of reciprocally moving within a valve body; an intermediate channel is disposed on an upstream end of the valve plug; the intermediate channel leads to a groove that is on an outer side surface of the valve plug; and an upstream end of the intermediate channel is in communication with the return cavity through the return channel, and a downstream end leads to the outside of the valve body through the groove that is on the outer side surface of the valve plug.

14. The container according to claim 11, wherein the valve combination comprises two openings sequentially provided within the return channel and a movable component located between the two openings.

15. The container according to claim 13, wherein the movable component is a sheet or a small ball.

* * * * *